April 5, 1932.  V. H. JENNINGS  1,852,083
REVERSING MULTIPLIER
Filed Jan. 14, 1931  3 Sheets-Sheet 1

FIG.1

INVENTOR
VICTOR H. JENNINGS
ATTORNEYS

INVENTOR
VICTOR H. JENNINGS
ATTORNEYS

April 5, 1932.   V. H. JENNINGS   1,852,083
REVERSING MULTIPLIER
Filed Jan. 14, 1931   3 Sheets-Sheet 3
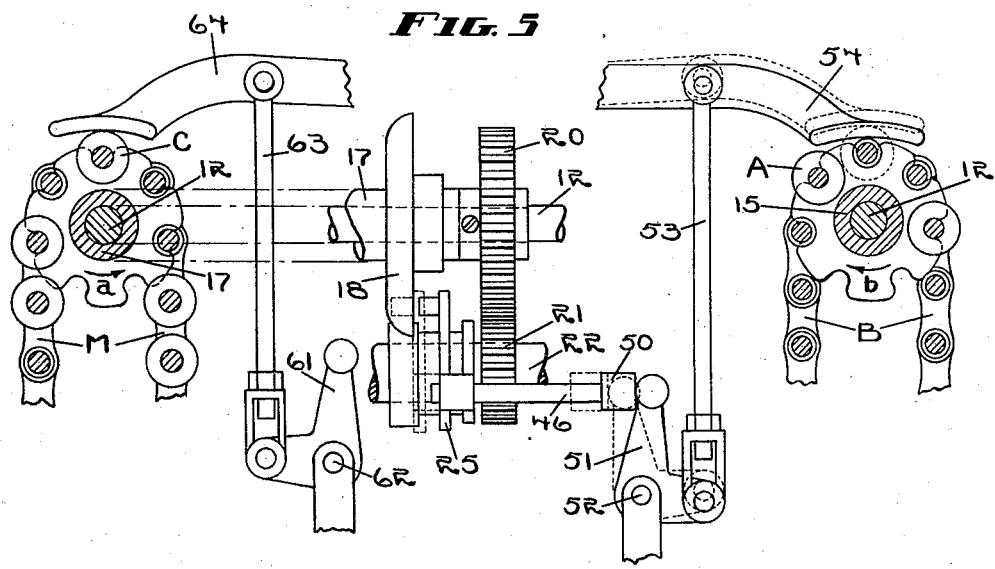
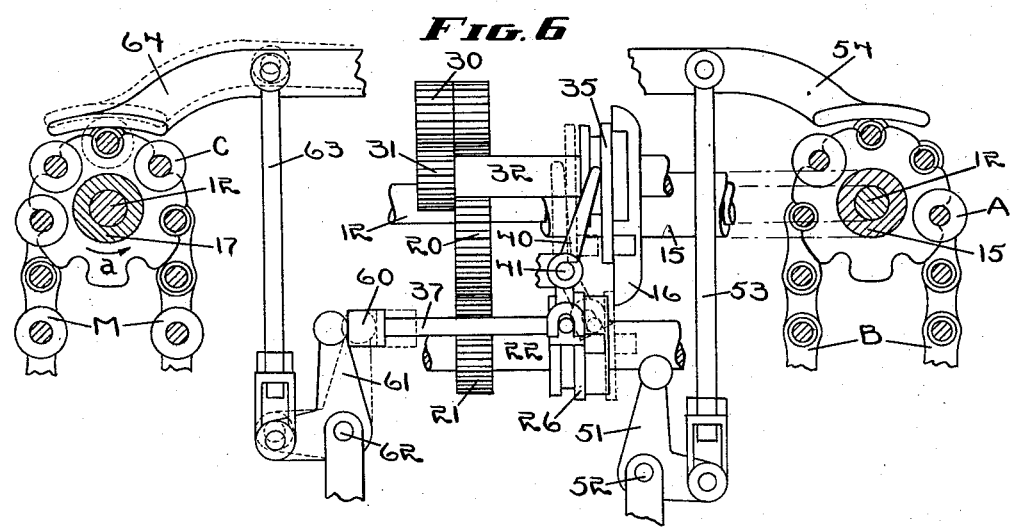
INVENTOR
VICTOR H. JENNINGS
ATTORNEYS Patented Apr. 5, 1932

1,852,083

UNITED STATES PATENT OFFICE

VICTOR H. JENNINGS, OF WORCESTER, MASSACHUSETTS, ASSIGNOR TO CROMPTON & KNOWLES LOOM WORKS, OF WORCESTER, MASSACHUSETTS, A CORPORATION OF MASSACHUSETTS

REVERSING MULTIPLIER

Application filed January 14, 1931. Serial No. 508,741.

This invention relates to mechanism for controlling the box changes in a drop box loom.

It is the general object of my invention to provide a multiplying mechanism so designed that the box chain may be reversed by the multiplying chain instead of being advanced always in the same direction. By using the multiplier to reverse the box chain, the length of the box chain may be very greatly reduced and the building of a pattern simplified.

A further object of the invention is to provide a multiplying mechanism by which the filling in a wool or worsted drop box loom may be conveniently mixed by providing two shuttles of each color and using them alternately.

My invention further relates to arrangements and combinations of parts which will be hereinafter described and more particularly pointed out in the appended claims.

A preferred form of the invention is shown in the drawings, in which

Fig. 1 is a front elevation of my improved multiplier;

Figure 3:
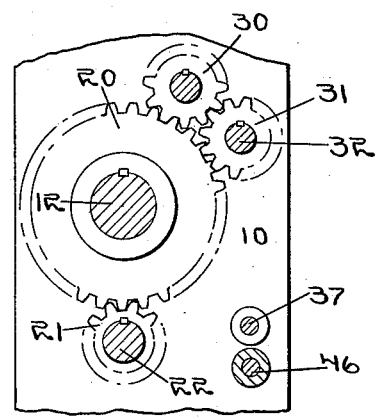
Figure 4:
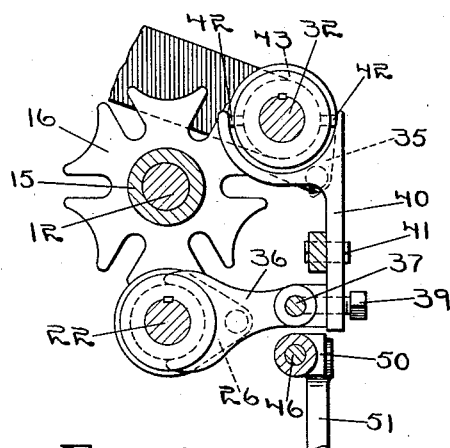

Figs. 3 and 4 are sectional end elevations, taken along the line 3—3 and 4—4 in Fig. 1 respectively, and Figs. 5 and 6 are diagrammatic views illustrating the operation of the multiplier.

Referring to the drawings, I have shown frame members 10 and 11 in which a shaft 12 is rotatably mounted. A gear 13 fixed on the shaft 12 is engaged by suitable driving mechanism and the shaft 12 is continuously rotated thereby.

A box chain B is mounted on a sleeve 15 (Fig. 6) which is freely rotatable on the shaft 12 as a bearing and which is provided at one end with a star wheel 16 fixed thereto. A multiplying chain M is similarly mounted on a sleeve 17 (Fig. 5) loosely rotatable on the shaft 12 and provided with a star wheel 18.

A gear 20 is fixed to the shaft 12 and is continuously rotated thereby. The gear 20 engages a pinion 21 on a pinion shaft 22 supported in a bearing in the frame member 10 and in a second bearing in a bracket 23 (Fig. 1).

Single tooth driving members or pin gears 25 and 26 are keyed to the pinion shaft 22 and are rotated continuously thereby, but are slidable axially on the shaft 22 and are normally held in inoperative position out of engagement with the star wheels 16 and 18 by coil springs 27 and 28.

The driving gear 20 is also engaged by a wide face intermediate pinion 30, which in turn drives a pinion 31 on an upper pinion shaft 32, rotatable in a bearing in the frame member 10 and in a bracket 33 (Fig. 1). An additional single tooth driving member or pin gear 35 is keyed to the upper pinion shaft 32 and is slidable thereon into and out of engagement with the star wheel 16.

A yoke 36 (Fig. 4) is mounted on an upper sliding bar 37 and extends into a groove in the hub of the pin gear 26. The bar 37 is slidable in a fixed bearing 38 (Fig. 1). The yoke 36 is secured on the bar 37 by a long set screw 39 (Fig. 4), a portion of which extends through the forked lower end of a yoke lever 40 (Fig. 1) mounted on a fixed pivot 41. The upper part of the yoke lever is provided with pins 42 extending into a groove 43 (Fig. 1) in the hub of the pin gear 35.

The parts are so proportioned that the pin gears 26 and 35 will be moved simultaneously and equally in opposite directions. Either one or the other of these pin gears always engages the star wheel 16 and the second pin gear is simultaneously disengaged.

Figure 2:
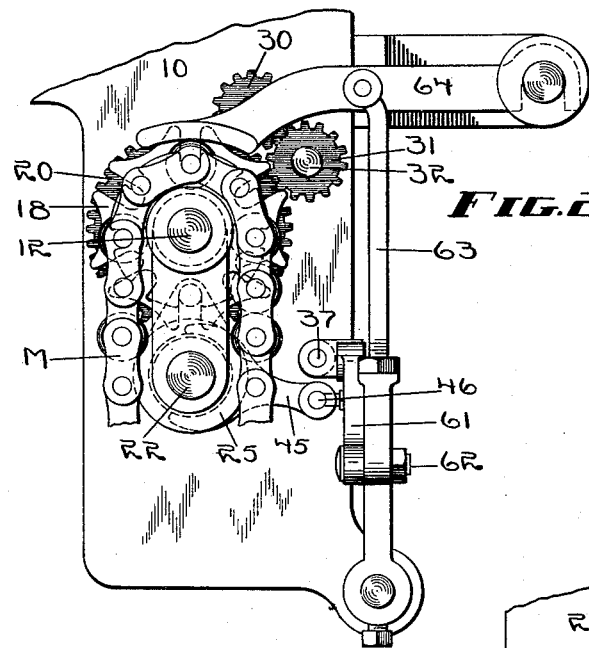
Fig. 2 is an end view thereof, looking in the direction of the arrow 2 in Fig. 1.

A yoke member 45 (Fig. 2) is mounted on a lower sliding bar 46 and extends into a groove in the hub of the pin gear 25. The bar 46 is slidable in a fixed bearing 47 (Fig. 1).

I will now describe the devices for moving the bars 37 and 46 and their associated yoke members axially against the yielding resistance of the springs 27 and 28.

A head 50 (Figs. 1 and 4) is fixed on the lower bar 46 and is engaged by the ball-shaped upper end of a bell crank 51 mounted on a fixed pivot 52. The second arm of the bell crank is connected by an adjustable link 53 to a pattern lever 54 (Fig. 5) positioned for engagement by the balls and sinkers in one row of the box chain B.

When the lever 54 engages a sinker, as indicated in full lines in Fig. 5, the ball-shaped end of the bell crank 51 moves away from the head 50 on the sliding bar 46 and allows the spring 28 (Fig. 1) to move the pin gear 25 out of engagement with the star wheel 18.

When a ball A comes under the lever 54 and moves it to the dotted line position in Fig. 5, the bell crank 51 forces the bar 46 to the left, moving the pin gear 25 to the operative position indicated in dotted lines in Fig. 5, whereby the star wheel 18 and multiplying chain M are advanced one space by the next revolution of the pin gear 25.

Similar mechanism is provided for sliding the upper bar 37. A head 60 (Fig. 6) is mounted on the bar 37 and is engaged by a bell crank 61 pivoted at 62 and connected by an adjustable link 63 to a lever 64, positioned for engagement by the balls or sinkers in the single row of the multiplying chain M.

When a sinker occurs under the lever 64, the lever occupies the full line position of Fig. 6, with the head of the bell crank 61 in its left hand full line position and with the bar 37 yieldingly forced to the left by the spring 27 (Fig. 1). Such movement causes the lower pin gear 26 to be disengaged from the star wheel 16 and the upper pin gear 35 to be engaged.

When a ball C comes under the lever 64, the lever is raised, rocking the bell crank to the position indicated in Fig. 6 against the pressure of the spring 27, sliding the bar 37 to the right and thereby disengaging the upper pin gear 35 and engaging the lower pin gear 26.

It will be noted that the provision of the intermediate gear 30 causes the upper pin gear 35 to rotate in the opposite direction from the lower pin gears 25 and 26.

By the operation of the mechanism above described, the multiplying chain M will be intermittently advanced in the direction of the arrow a in Figs. 5 and 6, the chain being advanced one space for every revolution of the pinion shaft 22 when a ball A in the box chain B is positioned under the lever 54.

On the other hand, the pattern chain B will be moved one space for every revolution of the pinion shafts 22 and 32, as one or the other of the pin gears 26 and 35 are always in operative position, but the direction of movement of the chain B is determined by the occurrence of a ball or sinker in the multiplying chain M under the pattern lever 64.

Having described the details of construction of my improved reversing multiplier, the operation thereof is as follows:

Assuming the parts to be in the normal running position indicated in Fig. 5, the box chain will be advanced one space in the direction of the arrow b for each revolution of the pinion shaft 22, provided the lever 64 is supported by a ball C on the multiplying chain M, as shown in full lines in Fig. 5.

The multiplying chain M will remain at rest and the box chain B will be intermittently advanced a space at a time until a ball A in the chain B raises the lever 54, which will cause engagement of the pin gear 25 with the star wheel 18 and will advance the multiplying chain one space in the direction of the arrow a in Fig. 5.

If the next bar in the multiplying chain has a sinker instead of a ball C, the lever 64 will drop, reversing the positions of the pin gears 26 and 35, and causing the box chain B to advance intermittently in the opposite direction until a ball A again raises the lever 54.

It will thus appear that the multiplying chain is at rest whenever sinkers in the chain B occur under the lever 54, but that the multiplying chain is advanced one step in the direction of the arrow a whenever a ball A appears under the lever 54. It will also appear that whenever the lever 64 is shifted from a ball C to a sinker in the multiplying chain M or from a sinker to a ball, the direction of movement of the box chain will be reversed.

Consequently, in my improved reversing multiplier I have a box chain which is always in motion and a multiplying chain which is normally at rest but which may be set in motion at any time and which, when in motion, is effective to reverse the direction of movement of the box chain as often as is desired.

My improved reversing multiplier is adapted for a wide variety of uses. For instance, two successive balls on the box chain and alternate balls and sinkers on the multiplying chain will cause the box chain to rock back and forth on two bars, using a pair of adjacent bars alternately for any length of time indicated by the length of the multiplying chain. In this way, two selected shuttles may be used alternately for mixing filling in a wool or worsted loom. When it is desired to advance the weaving to boxes having a different color of filling, three successive balls or three successive sinkers may be placed in the multiplying chain.

Similarly, my invention may be used for reversing a half pattern in weaving a symmetrical figure. This is accomplished by using sinkers on the box chain until half of the pattern has been woven and then putting in a ball to throw the multiplier chain into operation to reverse the direction of the box chain.

Many other uses for my improved reversing multiplier will occur to those skilled in the art. While I have described the invention as used in controlling drop box movements, it is also applicable for use in harness motions and in other pattern controlled mechanisms.

Having thus described my invention and the advantages thereof, I do not wish to be limited to the details herein disclosed, otherwise than as set forth in the claims, but what I claim is:—

1. In a loom, a pattern chain, a star wheel connected thereto, two pin gears mounted for selective engagement with said star wheel, means to rotate said pin gears continuously but in opposite directions, and means to cause a selected pin gear to engage said star wheel and to simultaneously disengage the other pin gear.

2. The combination in a loom as set forth in claim 1, in which a multiplying mechanism is provided to control the movements of said pin gears.

3. In a loom, a pattern chain, a multiplier chain, star wheels associated therewith, a single pin gear for the multiplying chain star wheels, a pair of pin gears for the pattern chain star wheel, driving connections through which said single pin gear and one of said pair of pin gears are continuously rotated in one direction and the other pin gear of the pair is continuously rotated in the opposite direction, and pattern-controlled means to selectively engage said pin gears with said star wheels and to prevent simultaneous engagement of both of the pin gears of said pair at one time with the pattern chain star wheel.

4. In a drop box loom, a box chain, a multiplying chain, and pattern-controlled connections by which said multiplying chain is effective to cause said box chain to be rocked back and forth on two adjacent bars of the box chain for a predetermined period of loom operation and to advance said box chain by repeated movements in either selected direction at the end of said predetermined period, the direction of such repeated movements being predetermined by said multiplying chain.

In testimony whereof I have hereunto affixed my signature.

VICTOR H. JENNINGS.